UNITED STATES PATENT OFFICE.

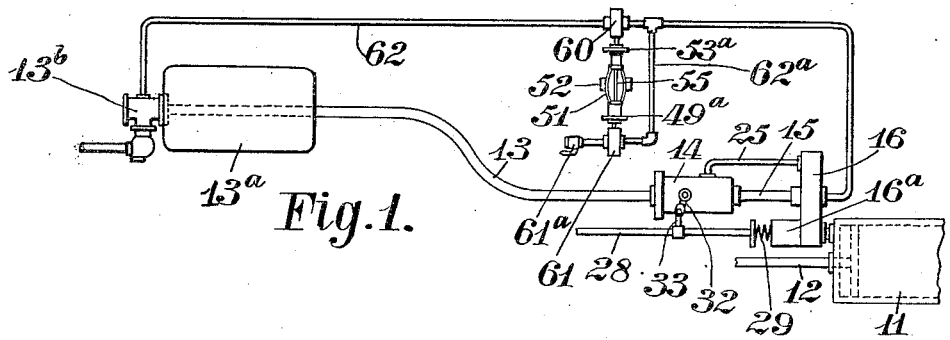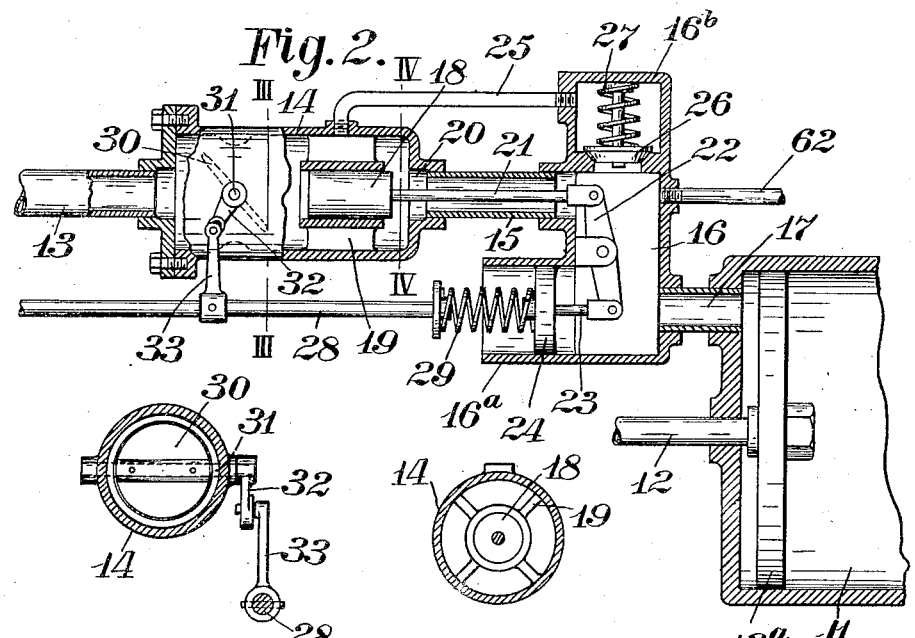

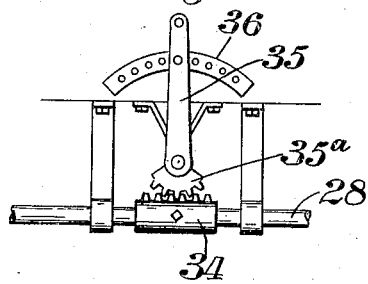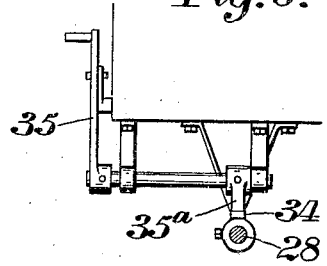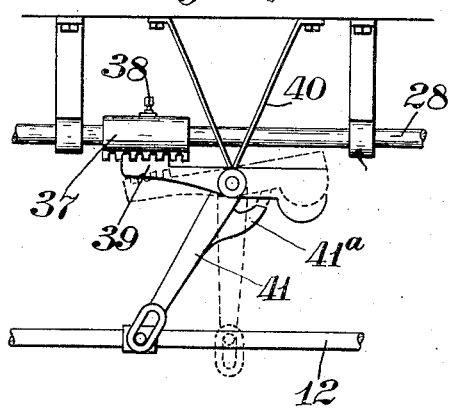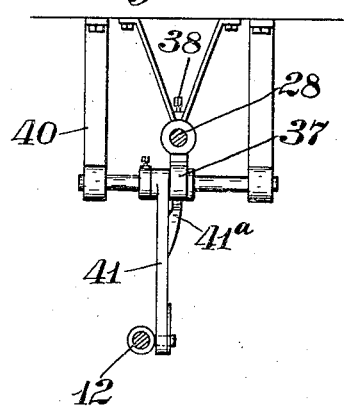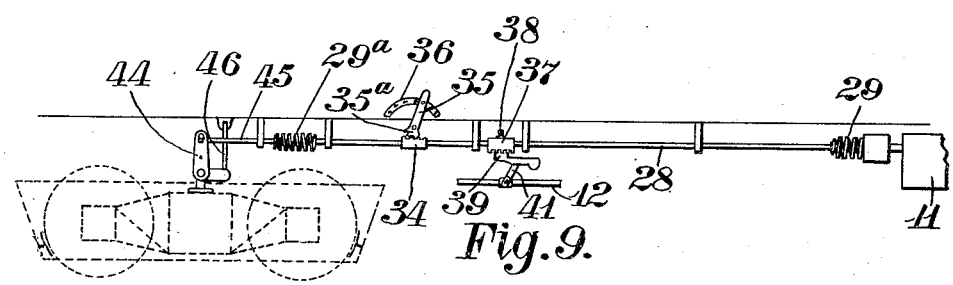

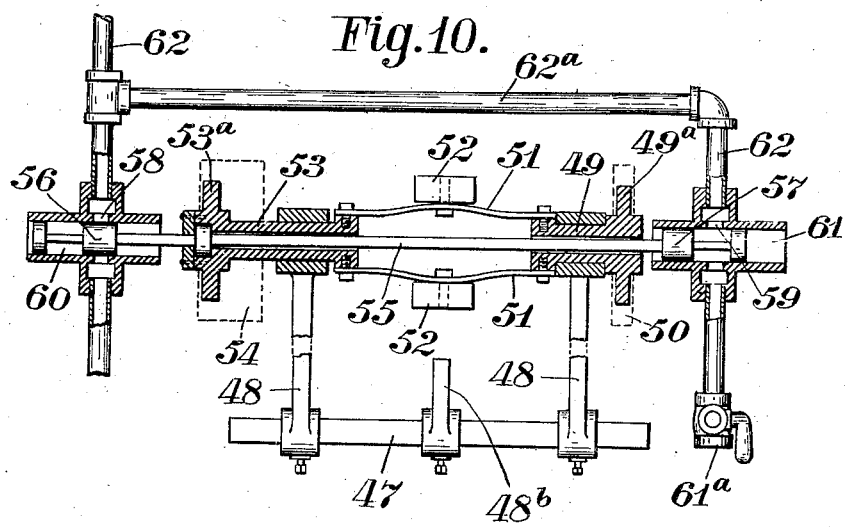
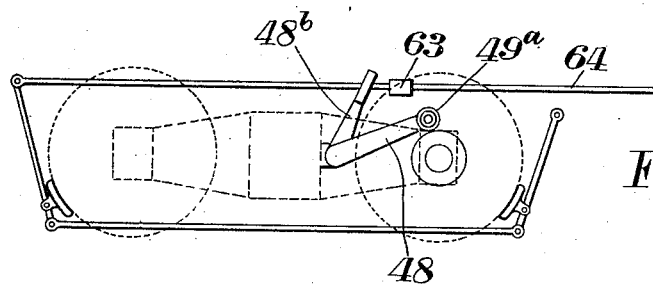
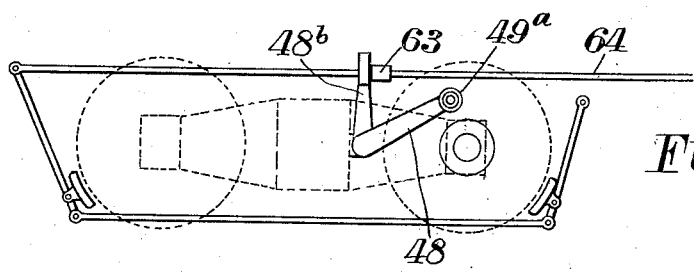

DELLNO BERGER, OF MADISON TOWNSHIP, FRANKLIN COUNTY, OHIO.

AIR BRAKE.

1,427,715.   Specification of Letters Patent.   Patented Aug. 29, 1922.

Application filed November 13, 1920. Serial No. 423,957.

*To all whom it may concern:*

Be it known that I, DELLNO BERGER, a citizen of the United States, residing at Madison Township, in the county of Franklin and State of Ohio, have invented a certain new and useful Improvement in Air Brakes, of which the following is a specification.

The loading of the several cars in an ordinary train of cars often varies so that some are light and others heavy. The braking friction necessary to retard and stop a lightly loaded car is obviously not so great as that required to retard a heavily loaded one. One object of the present invention is the provision of improved means to regulate the braking pressure for each car to correspond with the loading so as to secure upon each car and throughout the train a braking effect that is nearly uniform. A further object of the invention is to provide means for automatically supplying additional brake pressure, as where the ordinary service pressure is insufficient to satisfactorily or promptly retard and stop the motion of the train, said means also embodying devices whereby if the brakes be so firmly applied as to chock the wheels the brakes are automatically released sufficiently to permit resumption of the turning. Other objects will appear from the disclosure herein.

The invention is embodied in the example herein shown and described, the novel features being pointed out in the claims.

In the accompanying drawings—

Figure 1 is a diagrammatic view illustrating the air control system.

Fig. 2 is a sectional view on a larger scale of the mechanism for primarily admitting the supply of pressure to the brake cylinder.

Fig. 3 is a section on the line III—III Fig. 2, looking to the left.

Fig. 4 is a section on the line IV—IV Fig. 2 looking to the left.

Fig. 5 is a front view of the device for determining and fixing the pressure that shall be delivered to the brake cylinder.

Fig. 6 is a side view of the same.

Fig. 7 is a front view of the means for holding the pressure determining rod from oscillation when the rod is not set—as for example—when the car is empty or of normal weight.

Fig. 8 is a side view of the same.

Fig. 9 is a diagrammatic view showing the parts illustrated in Figs. 4, 5, 6 and 7 in their relation to each other on a car and also showing the means whereby the rod for determining the pressure to be delivered to the brake cylinder is automatically moved by the load to its position for setting.

Fig. 10 is a sectional view of the governor for controlling according to speed the admission of air to the brake cylinder.

Fig. 11 is a side view showing how the automatic governor is normally held out of operative position when running with the brakes released.

Fig. 12 is a similar view showing the governor lowered to operating position and the brakes applied.

In the several views 11 designates the brake cylinder and 12 the rod of the piston $12^a$ therein by which rod the brakes may be operated in the usual manner through the usual or any approved rigging. 13 designates a pipe for receiving pressure from the usual auxiliary reservoir $13^a$ through the usual triple valve $13^b$. The pipe 13 is connected with one end of a chamber 14 that in turn is connected by a pipe 15 with another chamber 16, the latter in turn being a part of or communicating as by pipe 17 with the brake cylinder. In the chamber 14 is a piston-like valve 18 supported in the bore of a spider 19, said valve 18 at the proper time seating on a seat 20 to close the pipe 15. The valve 18 has a stem 21 pivotally connected with one end of a lever 22, the other end of said lever having pivotally connected with it the stem 23 of a piston 24 working in a cylindrical extension $16^a$ at the lower end of the chamber 16. The upper portion of the chamber 16 has an extension $16^b$ communicating by pipe 25 with the chamber 14, and in said chamber $16^b$ is a poppet release valve 26 pressed by a spring 27 having a predetermined or regulated pressure.

28 designates a rod supported in suitable brackets alongside the car so as to be movable longitudinally. Between the piston 24 and one end of said rod 28 is a spring 29 so that if the rod be moved toward the piston and held the resistance to outward movement of the piston is increased, such resistance being proportional to the distance the rod is so moved and set. Within the chamber 14 is pivoted a damper 30 having its stem 31 provided externally of the chamber with crank arm 32 actuated by a finger 33 secured on the rod 28. The position of the rod 28 determines the position of the damper so that the greater the pressure of the spring 29 the larger the air passage through the chamber 14.

The rod 28 has fixed upon it a sleeve 34 provided with a toothed rack, and pivoted in a suitable bracket on the car above the rack is a lever 35 having a sector at 35$^a$ engaging that rack. The arm of the sector lever 35 works over an arcuate strip 36 on the side of the car said strip being provided with a series of holes, as indicated, either of which is adapted to receive a pin or other suitable locking device passed through it and a coinciding hole in the sector lever to lock the lever in the position to which it is moved by the shifted rod. The rod 28 has a second toothed sleeve 37 adjustably secured on the rod by means of a set screw 38. The toothed sleeve is normally engaged by the toothed arm of a lever 39 hung below the rod 28 in a suitable bracket 40 on the car, the other arm of said lever being weighted to hold the toothed end up in engaged position. Pivotally hung on the bracket 40 is an arm 41 provided with a finger 41$^a$, the lower end of said arm 41 having a pin and slot connection with the piston rod 12 so that when said rod 12 is moved to set the brakes the finger is raised to lift the weighted end of the lever 39 and release its toothed arm from engagement with the toothed sleeve 37. The lever 39 is designed to keep the rod 28 from reciprocating if desired so as to prevent wear when the sector lever 35 is not locked as for example when the car is running empty. Such lever 39 is not indispensable because when the car is running empty the spring 29$^a$ and the weight of the rod 28 will afford the necessary resistance to the piston 24. When the car is being loaded the lever 39 is held disengaged from the rack sleeve 37. The opposite end of the rod 28 is provided with a suitable buffer spring 29$^a$. On the wheel truck near the spring 29$^a$ is a bell crank lever 44 having its upper arm connected by a link rod 45 with the spring 29$^a$ while the lower arm of said lever is connected by means of a link rod 46 with a suitable bracket on the car. The loading of the car, therefore, depresses the rod 46 and moves the rod 28 to compress the springs 29 and 29$^a$. When the car is completely loaded and the rod is thus moved the sector lever 35 is swung to a new position and is there locked thus establishing the proper resistance to the piston 24.

The means for automatically admitting emergency pressure includes a supporting frame consisting of a shaft 47 upon which are secured a pair of arms 48 provided with bearings in which turns a centrifugal element. Said centrifugal element includes a rotary spool 49 the outer head 49$^a$ of which constitutes a friction member to be rotated by a contact wheel 50 (shown in broken lines Fig. 10) fixed on the axle of one of the pairs of the car wheels and to rotate therewith. The other head of said spool has secured to it the ends of the resilient strips 51 carrying the centrifugally actuated weights 52. Said spool 49 fits on its bearing so as to be held from lateral movement. In the bearing of the other arm 48 is a spool 53 having an elongated shank and to the inner head of said spool are secured the opposite ends of the flexible strips 51 while the outer head forms a friction member 53$^a$ rotated by a contact wheel 54 (shown in broken lines Fig. 10) fixed on the same wheel axle before referred to and to be rotated thereby. The elongated shank of the spool 53 permits it to be reciprocated by the outward and inward movement of the centrifugal weights and the width of the contact or drive wheel 54 normally insures continuity of rotation of said spool notwithstanding its change of plane due to the lateral movement effected by the centrifugal element. The spools referred to have axial bores through which extends a rod 55 having valves 56 and 57 at its opposite ends to work across ports 58 and 59 respectively in casings 60 and 61 respectively, said rod being connected with spool 53 to be moved longitudinally thereby. Said valves are constructed to confine the passage of pressure to the pipes when opened.

The valve casing 60 is put in a line of pipe 62 leading from a point of the triple valve to conduct pressure to chamber 16 upon an emergency application. Said pipe has a branch 62$^a$ leading through the casing 61. The continuation of the branch 62$^a$ beyond said casing 61 contains an ordinary pressure retaining valve 61$^a$.

The bar 47 of the frame 48—48 carrying the centrifugal element is provided with an arm 48$^b$ actuated by a stop 63 on any suitable rod 64 of the brake rigging to hold the heads 49$^a$ and 53$^a$ removed from the wheels 50 and 54 when the brakes are released, said stop being moved when the brake rigging is moved upon an ordinary service application of the brake to permit the heads 49$^a$ and 53$^a$ to contact with and be rotated by the members 50 and 54 to whirl the centrifugal element and thereby open the port of casing 60 and close that of 61.

The operation is as follows: An ordinary service application of the engineer's valve releases pressure to the pipe 13 and chamber 16 thereby moving the piston 12$^a$ and setting the brakes. In this operation the valve 18 is closed on its seat when the predetermined pressure is reached on piston 24. To release the brakes from an ordinary service stop the pressure in pipe 13 is reduced by suitable operation of the engineer's valve thereby permitting the escape of pressure past the valve 26 through the pipes 25 and 13. The exhaust of pressure in pipe 13 will permit the piston 24 to move to the right thereby causing valve 18 to open port 20 and free exhaust through pipe 13 and the triple valve. In an ordinary service application the heads 49ª and 53ª are dropped into contact with wheels 50 and 54 thereby opening port of casing 60 and closing that of 61 as before stated. If on such application the brakes do not operate with sufficient effect, or if a quick stop is desired, more pressure is admitted to chamber 16 by an operation of the engineer's valve to emergency position. This additional pressure passes through the pipe 62 and valve casing 60 to chamber 16. If in this operation the brake shoes chock the wheels the operation of the centrifugal element ceases thereby closing port of casing 60 and opening the port of casing 61 thus permitting a limited escape of pressure from the chamber 16 and a resumption of the operation of the centrifugal element. In this manner a nice regulation of the pressure in the chamber 16 and of the brake shoes is automatically maintained.

The invention is applicable to any air brake system where pressure can be supplied to the elements described.

Modification can be made in the forms of the parts without departing from the gist of the invention as claimed.

What I claim is:

1. In an air brake means for predetermining and fixing the amount of braking pressure to be applied including in combination a chamber communicating with the brake cylinder, means in said chamber actuated by the pressure admitted, a valve for cutting off the pressure admitted actuated by said means, adjustable yielding means resisting the actuation of said pressure actuated means and means connected with said adjustable yielding means for retarding the admission of pressure to said chamber.

2. In an air brake for a car, a conductor for air pressure between a reservoir and the brake cylinder, and a conductor for the release of pressure from the brake cylinder provided with a retaining valve, a governor actuated by the motion of the car wheels for holding the first named conductor in open condition and the second named conductor closed.

3. In an air brake for a car, an equipment for an ordinary service application of the brakes, an emergency equipment including means actuated by the motion of the car wheels for permitting the admission of augmenting pressure to the brake cylinder, and means for automatically releasing pressure from the brake cylinder upon the cessation of motion of the wheels.

4. In an air brake for a car, an equipment for an ordinary service application of the brakes, an emergency equipment for permitting the admission of an augmenting pressure to the brake cylinder, and a governor actuated by the motion of the car wheel for automatically controlling said augmenting supply of pressure.

5. In an air brake for a car, an equipment for an ordinary service application of the brakes, an emergency equipment for permitting the admission of an augmenting pressure to the brake cylinder, a governor actuated by the motion of the car wheels for automatically controlling said augmenting supply of pressure and means also actuated by said governor for preventing an excess of the augmenting supply of pressure.

6. In an air brake for a car, the combination of a conductor for air pressure between a pressure reservoir and the brake cylinder, and a conductor for the release of pressure from the brake cylinder, a governor actuated by the motion of the car wheels for holding the first named conductor in open position, and means actuated by the brake piston for holding said governor out of operative position when the brakes are not set.

DELLNO BERGER.